(12) United States Patent
Mamtimin

(10) Patent No.: US 12,276,769 B2
(45) Date of Patent: Apr. 15, 2025

(54) PULSED NEUTRON INFORMED MACHINE LEARNING TECHNIQUES TO DETERMINE POROSITY AND LITHOLOGY

(71) Applicant: Halliburton Energy Services, Inc., Houston, TX (US)

(72) Inventor: Mayir Mamtimin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 218 days.

(21) Appl. No.: 17/984,674

(22) Filed: Nov. 10, 2022

(65) Prior Publication Data

US 2023/0314652 A1  Oct. 5, 2023

Related U.S. Application Data

(60) Provisional application No. 63/326,020, filed on Mar. 31, 2022.

(51) Int. Cl.
| | |
|---|---|
| *G01V 5/06* | (2006.01) |
| *G01V 5/04* | (2006.01) |
| *G01V 5/10* | (2006.01) |
| *G06N 3/063* | (2023.01) |
| *G06N 3/08* | (2023.01) |

(52) U.S. Cl.
CPC .............. *G01V 5/102* (2013.01); *G01V 5/045* (2013.01); *G06N 3/063* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 11,320,563 B2 | 5/2022 | Mamtimin et al. | |
| 11,378,715 B2 | 7/2022 | Mamtimin et al. | |
| 2007/0011115 A1 | 1/2007 | Smith et al. | |
| 2007/0246649 A1 | 10/2007 | Jacobi et al. | |
| 2010/0193676 A1 | 8/2010 | Jacobson et al. | |
| 2011/0282818 A1 | 11/2011 | Chen et al. | |
| 2019/0204121 A1 | 7/2019 | Yen et al. | |
| 2021/0373193 A1 | 12/2021 | Mamtimin et al. | |
| 2021/0373194 A1 | 12/2021 | Mamtimin et al. | |
| 2021/0373195 A1 | 12/2021 | Mamtimin et al. | |

(Continued)

OTHER PUBLICATIONS

International Search Report and Written Opinion for International Patent Application No. PCT/US2022/051399 dated Apr. 14, 2023.

(Continued)

*Primary Examiner* — Hoon K Song
(74) *Attorney, Agent, or Firm* — John Wustenberg; C. Tumey Law Group PLLC

(57) ABSTRACT

A method and system for identifying formation porosity and formation lithology. The method may include disposing a PNL tool into a borehole that is disposed in a formation, emitting a neutron from a neutron source on the PNL tool into the formation, and capturing one or more gammas expelled from formation in response to the neutron from the neutron source to form a plurality of pulsed neutron logging (PNL) measurements in a log. The method may further include identifying a formation porosity and a formation lithology with an artificial neural network that at least partially incorporates the PNL measurements.

20 Claims, 9 Drawing Sheets

(56) References Cited

U.S. PATENT DOCUMENTS

| | | |
|---|---|---|
| 2022/0171086 A1 | 6/2022 | Mamtimin et al. |
| 2022/0171087 A1 | 6/2022 | Mamtimin et al. |
| 2022/0171088 A1 | 6/2022 | Mamtimin et al. |
| 2022/0179121 A1* | 6/2022 | Craddock ................ G06N 3/08 |
| 2022/0291416 A1 | 9/2022 | Mamtimin et al. |
| 2022/0317330 A1 | 10/2022 | Mamtimin et al. |
| 2022/0319166 A1 | 10/2022 | Mamtimin et al. |
| 2023/0083045 A1* | 3/2023 | Zhan ...................... G06N 3/045 |
| | | 702/2 |

OTHER PUBLICATIONS

Craddock, et al., Enhanced Mineral Quantification and Uncertainty Analysis From Downhole Spectroscopy Logs Using Variational Autoencoders, Paper presented at the SPWLA 62nd Annual Logging Symposium, Virtual Event, May 2021. SPWLA-2021-0069. doi.org/10.30632/SPWLA-2021-0069.

Freedman, Robert; Herron, Susan; Anand, Vivek; Herron, Michael; May, Dale; Rose, David (2015). New Method for Determining Mineralogy and Matrix Properties From Elemental Chemistry Measured by Gamma Ray Spectroscopy Logging Tools. SPE Reservoir Evaluation & Engineering, 18(4), 599-608.

\* cited by examiner

PULSED NEUTRON INFORMED MACHINE LEARNING TECHNIQUES TO DETERMINE POROSITY AND LITHOLOGY

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. Petrophysical properties of a formation may be utilized as additional information that may further drive strategies for hydrocarbon production. Petrophysical properties may comprise borehole size and casing size, tool position and standoff, borehole fluid content, casing and cement quality, formation lithology, formation porosity, formation oil saturation, and/or holdup.

Generally, a pulsed neutron logging (PNL) tool is used to determine petrophysical properties of a formation. A PNL tool may operate and function by utilizing nuclear detectors to measure induced gammas by interaction of high energy neutrons that are emitted from a generator. Induced gamma measurements may include inelastic spectrum and capture spectrum. In examples, these measurements may allow for the determination of petrophysical properties of a formation.

It is often challenging to find multiple petrophysical properties simultaneously when using PNL tool. This is because the fast neutron interaction in borehole environment is complex, and its response function is a convoluted effect of all the aspects of borehole conditions. Traditionally, methods and systems may isolate one petrophysical property and correlate it with PNL measurements to determine formation porosity and/or lithology. Generally, formation porosity is found, which may be used mathematically to determine formation lithology. However, mathematically computing formation lithology with mathematical computations of formation porosity may be a slow and inaccurate process and only possible for open hole applications.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for identifying formation lithology and formation porosity using pulsed neutron logging (PNL) measurements. Methods and systems described below may determine formation porosity and formation lithology with PNL measurements for cased wells. Additionally, PNL measurements may be placed into an artificial neural network that is trained to identify the formation lithology and formation porosity at the same time. Herein, formation porosity and formation lithology may be referred to as a formation property.

Figure 1:
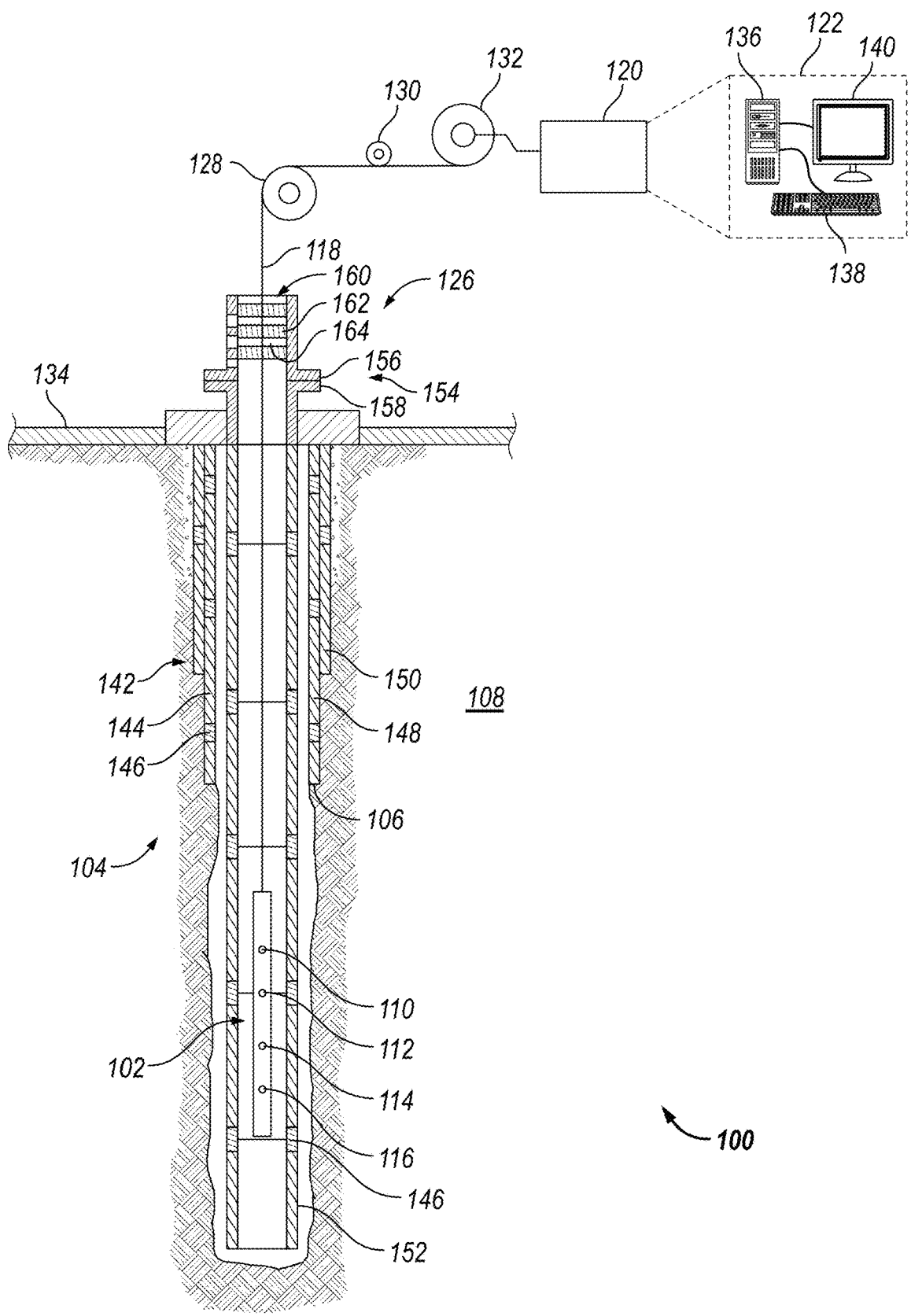
FIG. 1 illustrates logging operation.

FIG. 1 illustrates logging operation 100, as disclosed herein, utilizing a PNL tool 102. FIG. 1 illustrates a cross-section of borehole 104 with a PNL tool 102 traveling through well casing 106. Borehole 104 may traverse through formation 108 as a vertical well and/or a horizontal well. PNL tool 102 contains a neutron source 110, a first neutron detector 112, a second neutron detector 114, and a gamma ray detector 116. PNL tool 102 is suspended by a conveyance 118, which communicates power from a logging facility 150 to PNL tool 102 and communicates telemetry from PNL tool 102 to information handling system 122. In examples, PNL tool 102 may be operatively coupled to a conveyance 118 (e.g., wireline, slickline, coiled tubing, pipe, downhole tractor, and/or the like) which may provide mechanical suspension, as well as electrical connectivity, for PNL tool 102. Conveyance 118 and PNL tool 102 may extend within casing string 162 to a desired depth within borehole 104. Conveyance 118, which may include one or more electrical conductors, may exit wellhead 126, may pass around pulley 128, may engage odometer 160, and may be reeled onto a winch, which may be employed to raise and lower the tool assembly in borehole 104. The position of PNL tool 102 may be monitored in a number of ways, including an inertial tracker in PNL tool 102 and a paid-out conveyance length monitor in logging facility 150 (e.g., an idler wheel on the wireline cable).

Multiple such measurements may be desirable to enable the system to compensate for varying cable tension and cable stretch due to other factors. Information handling system 122 in logging facility 150 collects telemetry and position measurements and provides position-dependent logs of measurements from PNL tool 102 and values that may be derived therefrom.

PNL tool 102 generally includes multiple instruments for measuring a variety of downhole parameters. Wheels, bow springs, fins, pads, or other centralizing mechanisms may be employed to keep PNL tool 102 near the borehole axis during measurement operations. During measurement operations, generally, measurements may be performed as PNL tool 102 is drawn up hole at a constant rate. The parameters and instruments may vary depending on the needs of the measurement operation.

PNL tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation as measurable gamma rays. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116 via traditional techniques.

Measurements taken by pulsed neutron logging (PNL) tool 92 may be gathered and/or processed by information handling system 122. For example, signals recorded by PNL tool 102 may be sent to information handling system 122 where they may be stored on memory and then processed. The processing may be performed real-time during data acquisition or after recovery of PNL tool 102. Processing may alternatively occur downhole on an information handling system 91 disposed on PNL tool 102 or may occur both downhole and at surface. In some examples, signals recorded by PNL tool 102 may be conducted to information handling system 122 by way of conveyance 118. Information handling system 122 may process the signals, and the information contained therein may be displayed for an operator to observe and stored for future processing and reference. Information handling system 122 may also contain an apparatus for supplying control signals and power to PNL tool 102.

As noted above, systems and methods of the present disclosure may be implemented, at least in part, with information handling system 122. While shown at surface 134, information handling system 122 may also be located at another location that is remote from borehole 104. In examples information handling system 122 may be disposed on PNL tool 102, which may allow for processing to occur downhole. Additionally, one or more information handling systems 122 may be utilized during measurement operations. In such examples, a first information handling system 122 may be at surface 134 and a second information handling system 122 may be disposed on PNL tool 102 downhole. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 122 may be a processing unit 136, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system 122 may include one or more disk drives, one or more network ports for communication with external devices as well as an input device 138 (e.g., keyboard, mouse, etc.) and video display 140. Information handling system 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 162 may extend from wellhead 126 at or above ground level to a selected depth within borehole 104. Casing string 162 may comprise a plurality of joints 144 or segments of casing string 162, each joint 144 being connected to the adjacent segments by a collar 146. There may be any number of layers in casing string 162. For example, a first casing 148 and a second casing 170. It should be noted that there may be any number of casing layers. FIG. 1 also illustrates a typical pipe string 182, which may be positioned inside of casing string 162 extending part of the distance down borehole 104. Pipe string 182 may be production tubing, tubing string, casing string, or other pipe disposed within casing string 162. Pipe string 182 may comprise concentric pipes. It should be noted that concentric pipes may be connected by collars 146. PNL tool 102 may be dimensioned so that it may be lowered into borehole 104 through pipe string 182, thus avoiding the difficulty and expense associated with pulling pipe string 182 out of borehole 104. In examples, cement (not illustrated) may be disposed on the outside of pipe string 182. Cement may further be disposed between pipe string 182 and casing string 162. It should be noted that cement may be disposed between any number of casings, for example between first casing 148 and second casing 170.

In logging systems, such as, for example, logging systems utilizing the PNL tool 102, a digital telemetry system may be employed, wherein an electrical circuit may be used to both supply power to PNL tool 102 and to transfer data between information handling system 122 and PNL tool 102. A DC voltage may be provided to PNL tool 102 by a power supply located above ground level, and data may be coupled to the DC power conductor by a baseband current pulse system. Alternatively, PNL tool 102 may be powered by batteries located within the downhole tool assembly, and/or the data provided by PNL tool 102 may be stored within the downhole tool assembly, rather than transmitted to the surface during logging (corrosion detection).

With continued reference to FIG. 1, wellhead 126 is described. Wellhead 126 allows for entry into borehole 104, such as the placement of PNL tool 102 into pipe string 182. In examples, wellhead 126 may include a lubricator head 154 may comprise a lubricator head flange 156 which may be coupled to and sealed with lubricator body flange 158. Lubricator head 154 comprises sealing cartridge 180. Sealing cartridge 180 may be removable from lubricator head 154. Sealing cartridge 180 may be a container comprising a plurality of sealing elements 192 and lubricator cavities 164. Sealing elements 192 may comprise, but are not limited to, elastomeric materials, thermoplastic materials, thermosetting materials, composites thereof, or combinations thereof. Sealing elements 192 comprise an inner diameter to allow for PNL tool 102, conveyance 118, wireline, coiled tubing, and/or the like to be disposed into borehole 104. Sealing elements 192 form a seal around conveyance 118 (or tubing if provided). Sealing elements 192 are selected such that the length of the diameter of the inner diameter is able to sufficiently seal around conveyance 118. In some example methods, a sealing cartridge 180 comprising a plurality of sealing elements 192 of one size may be removed if desired and exchanged for a different sealing cartridge 180 comprising a plurality of sealing elements 192 of a different size if desired. For example, if a wireline operation may utilize sealing elements 192 of a first size, upon completion of said wireline operation, the sealing cartridge 180 comprising the sealing elements 192 of a first size may be removed from lubricator head 154 and replaced with a second sealing cartridge 180 comprising sealing elements 192 of a second size to perform a subsequent operation, for example a tripping operation. A configuration for PNL tool 102 is illustrated in FIG. 1. However, there may be other possible configurations, to be discussed in detail below. Additionally, FIG. 1 illustrates an information handling system. In examples, information handling system 122 may comprise a chipset.

Figure 2:
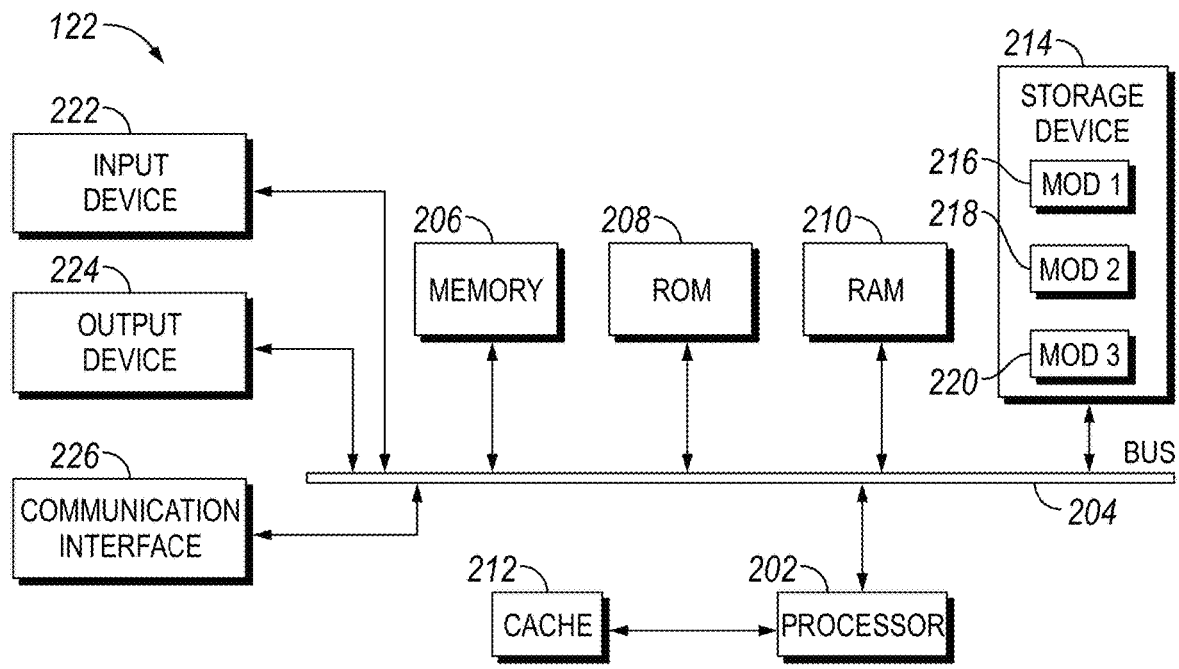
FIG. 2 illustrates an example information handling system.

FIG. 2 illustrates an example information handling system 122 which may be employed to perform various steps, methods, and techniques disclosed herein. Persons of ordinary skill in the art will readily appreciate that other system examples are possible. As illustrated, information handling system 122 includes a processing unit (CPU or processor) 202 and a system bus 204 that couples various system components including system memory 206 such as read only memory (ROM) 208 and random access memory (RAM) 210 to processor 202. Processors disclosed herein may all be forms of this processor 202. Information handling system 122 may include a cache 212 of high-speed memory connected directly with, in close proximity to, or integrated as part of processor 202. Information handling system 122 copies data from memory 206 and/or storage device 214 to cache 212 for quick access by processor 202. In this way, cache 212 provides a performance boost that avoids processor 202 delays while waiting for data. These and other modules may control or be configured to control processor 202 to perform various operations or actions. Other system memory 206 may be available for use as well. Memory 206 may include multiple different types of memory with different performance characteristics. It may be appreciated that the disclosure may operate on information handling system 122 with more than one processor 202 or on a group or cluster of computing devices networked together to provide greater processing capability. Processor 202 may include any general-purpose processor and a hardware module or software module, such as first module 216, second module 218, and third module 220 stored in storage device 214, configured to control processor 202 as well as a special-purpose processor where software instructions are incorporated into processor 202. Processor 202 may be a self-contained computing system, containing multiple cores or processors, a bus, memory controller, cache, etc. A multi-core processor may be symmetric or asymmetric. Processor 202 may include multiple processors, such as a system having multiple, physically separate processors in different sockets, or a system having multiple processor cores on a single physical chip. Similarly, processor 202 may include multiple distributed processors located in multiple separate computing devices but working together such as via a communications network. Multiple processors or processor cores may share resources such as memory 206 or cache 212 or may operate using independent resources. Processor 202 may include one or more state machines, an application specific integrated circuit (ASIC), or a programmable gate array (PGA) including a field PGA (FPGA).

Each individual component discussed above may be coupled to system bus 204, which may connect each and every individual component to each other. System bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within information handling system 122, such as during start-up. Information handling system 122 further includes storage devices 214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 214 may include software modules 216, 218, and 220 for controlling processor 202. Information handling system 122 may include other hardware or software modules. Storage device 214 is connected to the system bus 204 by a drive interface. The drives and the associated computer-readable storage devices provide nonvolatile storage of computer-readable instructions, data structures, program modules and other data for information handling system 122. In one aspect, a hardware module that performs a particular function includes the software component stored in a tangible computer-readable storage device in connection with the necessary hardware components, such as processor 202, system bus 204, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 122 is a small, handheld computing device, a desktop computer, or a computer server. When processor 202 executes instructions to perform "operations", processor 202 may perform the operations directly and/or facilitate, direct, or cooperate with another device or component to perform the operations.

As illustrated, information handling system 122 employs storage device 214, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 122, an input device 222 represents any number of input mechanisms, such as a microphone for speech, a touch-sensitive screen for gesture or graphical input, keyboard, mouse, motion input, speech and so forth. Additionally, input device 222 may take in data from first neutron detector 112, second neutron detector 114, and/or gamma ray detector 116 (e.g., referring to FIG. 1), discussed above. An output device 224 may also be one or more of a number of output mechanisms known to those of skill in the art. In some instances, multimodal systems enable a user to provide multiple types of input to communicate with information handling system 122. Communications interface 226 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 202, that is purpose-built to operate as an equivalent to software executing on a general purpose processor. For example, the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 208 for storing software performing the operations described below, and random-access memory (RAM) 210 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 122 may practice all or part of the recited methods, may be a part of the recited systems, and/or may operate according to instructions in the recited tangible computer-readable storage devices. Such logical operations may be implemented as modules configured to control processor 202 to perform particular functions according to the programming of software modules 216, 218, and 220.

In examples, one or more parts of the example information handling system 122, up to and including the entire information handling system 122, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application.

Figure 3:
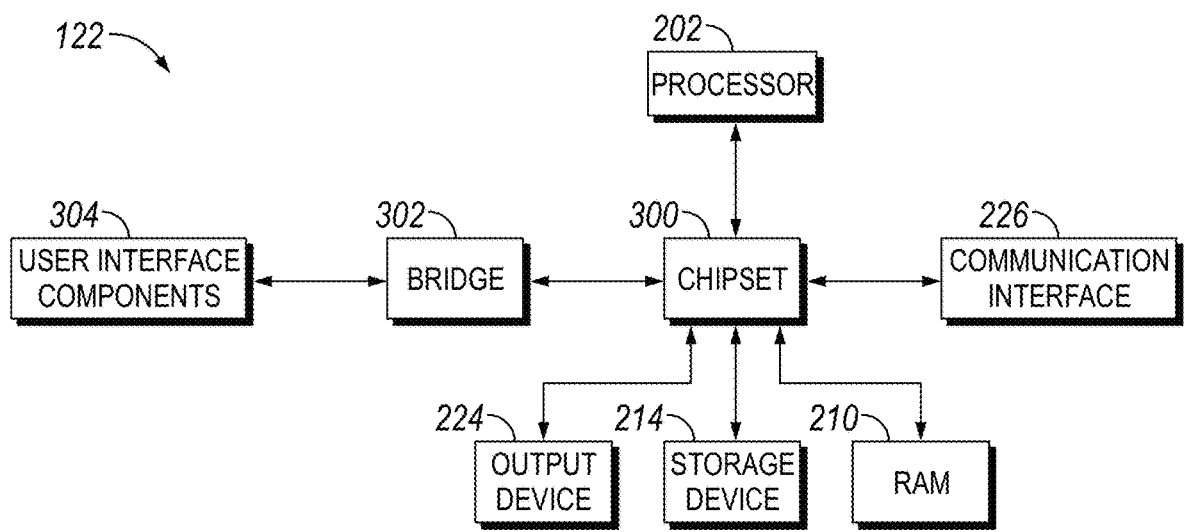
FIG. 3 illustrates a schematic of a chipset architecture.

FIG. 3 illustrates an example information handling system 122 having a chipset architecture that may be used in executing the described method and generating and displaying a graphical user interface (GUI). Information handling system 122 is an example of computer hardware, software, and firmware that may be used to implement the disclosed technology. Information handling system 122 may include a processor 202, representative of any number of physically and/or logically distinct resources capable of executing software, firmware, and hardware configured to perform identified computations. Processor 202 may communicate with a chipset 300 that may control input to and output from processor 202. In this example, chipset 300 outputs information to output device 224, such as a display, and may read and write information to storage device 214, which may include, for example, magnetic media, and solid-state media. Chipset 300 may also read data from and write data to RAM 210. A bridge 302 for interfacing with a variety of user interface components 304 may be provided for interfacing with chipset 300. User interface components 304 may include a keyboard, a microphone, touch detection and processing circuitry, a pointing device, such as a mouse, and so on. In general, inputs to information handling system 122 may come from any of a variety of sources, machine generated and/or human generated.

Chipset 300 may also interface with one or more communication interfaces 226 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 202 analyzing data stored in storage device 214 or RAM 210. Further, information handling system 122 receives inputs from a user via user interface components 304 and executes appropriate functions, such as browsing functions by interpreting these inputs using processor 202.

In examples, information handling system 122 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. During logging operations information handling system 122 may process different types of real time data PNL tool 102.

Figure 4:
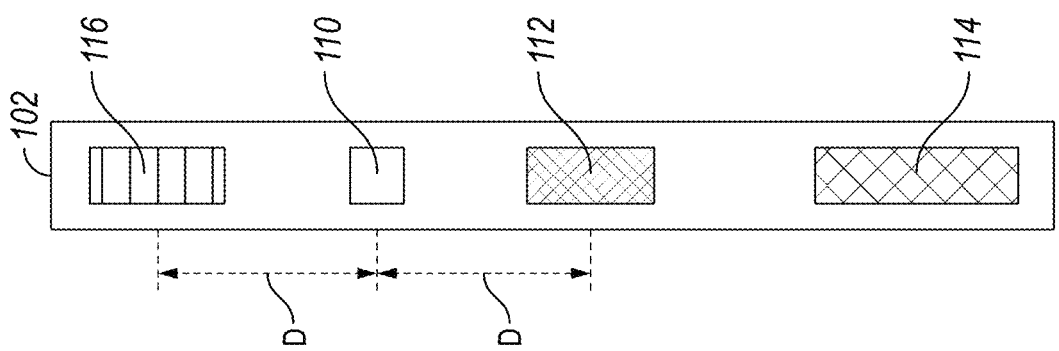
FIG. 4 shows a first illustrative setup of a pulsed neutron logging (PNL) tool.

FIG. 4 shows a first illustrative setup of PNL tool 102 having a pulsed neutron source 110 that is positioned equidistant from a gamma ray detector 116 and a first neutron detector 112. However, there may be examples in which neutron source 110 is not positioned equally to gamma ray detector 116 and first neutron detector 112. In examples, pulsed neutron source 110 may be replaced with a continuous neutron source such as Americium-Beryllium (Am—Be) chemical source. PNL tool 102 may also include a second neutron detector 114. The two neutron detectors 112 and 114 may be, respectively, termed the "near" and "far" neutron detectors. "Near" being the closest neutron detector to pulsed neutron source 110 and "far" being the furthest neutron detector from pulsed neutron source 110. Neutron detectors 112 and 114 may be designed to count thermal (around about 0.025 eV) and/or epithermal (between about 0.1 eV and 90 eV) neutrons. Suitable neutron detectors include Helium-3 (He-3) filled proportional counters, though other neutron counters may also be used. To improve tool performance, each neutron detector 112 and/or 114 may be implemented as a bank of individual detection devices. In accordance with standard neutron porosity tool measurement techniques, the ratio of far-to-near neutron detector counts is indicative of formation porosity.

With continued reference to FIG. 4, gamma ray detector 116 may be implemented as a scintillation crystal coupled to a photomultiplier tube. As with neutron detectors 112 and/or 114, gamma ray detector 116 may be implemented as a bank of individual detection devices whose results are aggregated. In FIG. 4, gamma ray detector 116 is "co-distant" with the near neutron detector 112, i.e., it is positioned at the same distance D from neutron source 110 as near neutron detector 112. As illustrated in FIG. 5, gamma ray detector 116 and first neutron detector 112 may be located in opposite directions from neutron source 110. As previously shown in FIGS. 1 and 2, gamma ray detector 116 may be configured to be disposed at distinct locations from first neutron detector 112 and second neutron detector 114. However, gamma ray detector 116 may be disposed the same length as from first neutron detector 112 and second neutron detector 114 from neutron source 110.

Figure 5B:
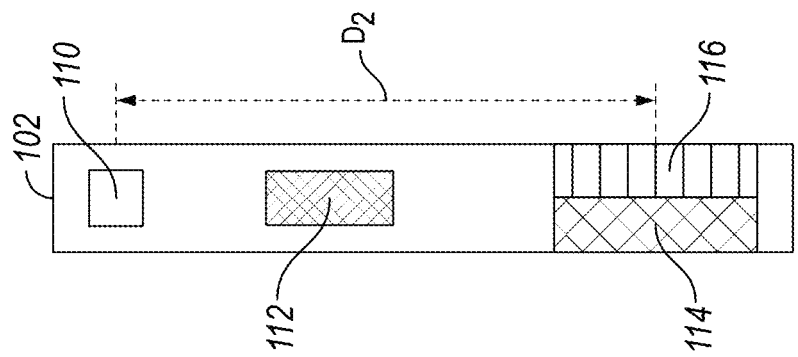
FIG. 5B illustrates example in which the PNL tool comprises a gamma ray detector and a far neutron detector co-located at a second distance.
Figure 5A:
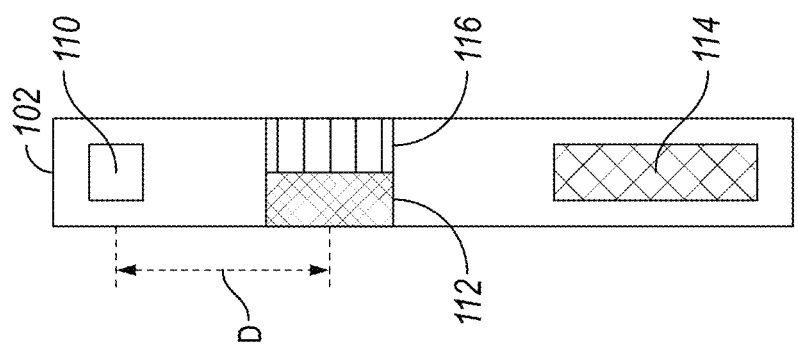
FIG. 5A illustrates alternative embodiments of the PNL tool where a gamma ray detector and a near neutron detector are co-located.

FIG. 5A illustrates alternative embodiments of PNL tool 102 where gamma ray detector 116 and a near neutron detector 112 co-located, i.e., located side-by-side at the same distance D from the neutron source 110. FIG. 5B illustrates an example in which PNL tool 102 comprises a gamma ray detector 116 and a far neutron detector 114 co-located at a second distance D2 from neutron source 110.

Multiple neutron detectors such as first neutron detector 112 and second neutron detector 114 of PNL tool 102, enable PNL tool 102 to measure formation porosity and lithology. Formation porosity may be measured using any of the existing multiple-spacing techniques employing any number of neutron sources 110, neutron detectors 112 and 114, and gamma ray detector 116. In addition, the presence of gamma ray detector 116 having a common distance from neutron source 110 with one of the neutron detectors 112 or 114, enables the measurement of formation porosity and lithology, discussed below.

During measurement operations, neutrons emitted from neutron source 110 undergo weak electromagnetic scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. In addition to scattering, neutrons may also undergo an absorption interaction. In most absorption interactions, elastic cross section is nearly constant, whereas the inelastic scattering cross section and absorption cross sections are proportional to the reciprocal of the neutrons speed. Herein, cross section may be referred to as the probability for a nucleus to undergo an interaction with a neutron.

Figure 6:
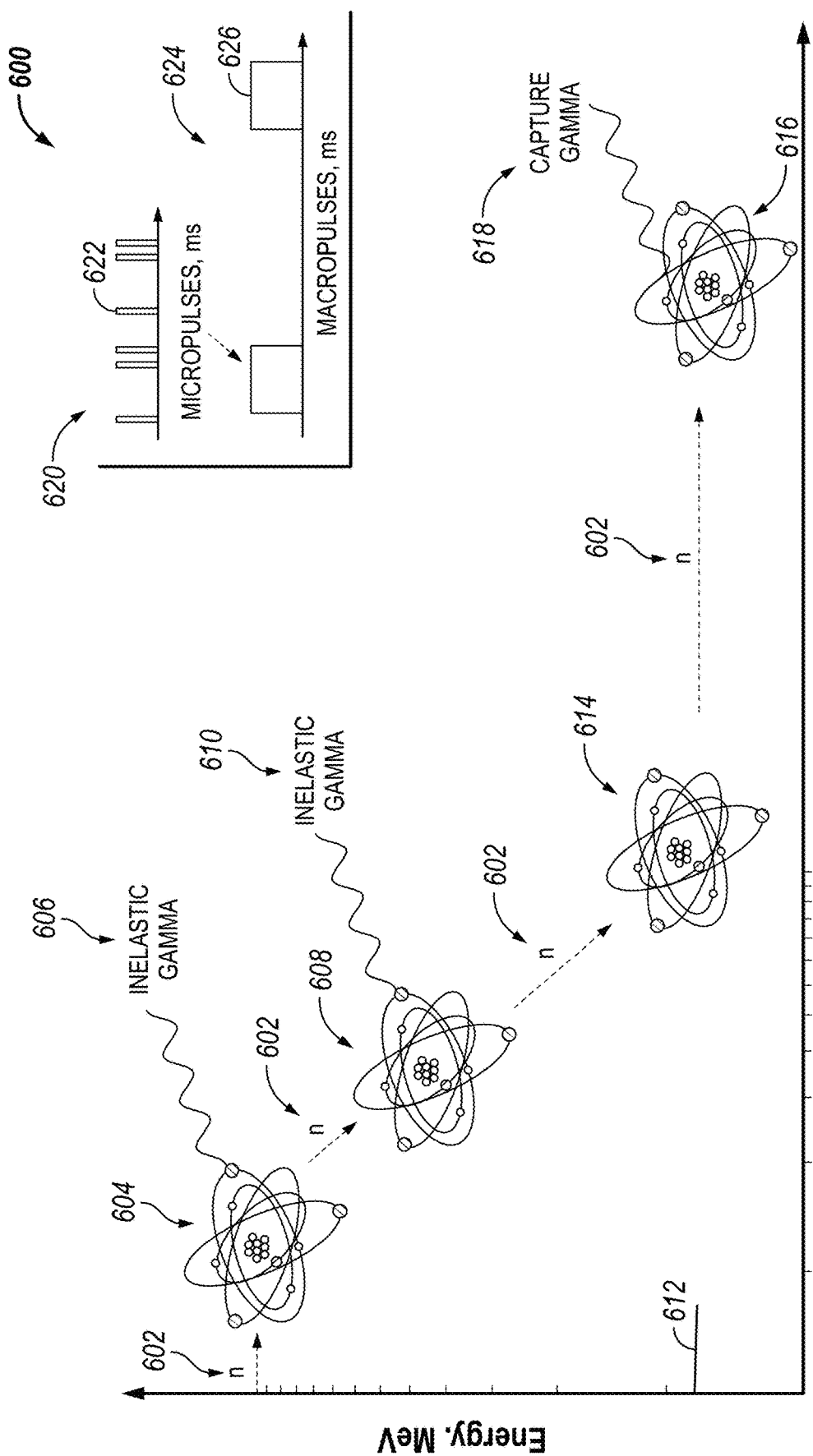
FIG. 6 is a graph that illustrates the energy path of a neutron emitted from neutron source.

FIG. 6 illustrates a graph 600 showing the energy path of a neutron 602 emitted from neutron source 110 (e.g., referring to FIG. 1) as it interacts with one or more nuclei in borehole 104 and formation 108. As illustrated, neutron 602 may be traveling at a fast speed with high kinetic energy and interacts with nuclei 604 in an inelastic interaction, releasing inelastic gamma 606 and lowering the energy state of nuclei 604. Neutron 602 may comprise an energy of 14 MeV with a range of +/−5 MeV. After the interaction, neutron 602 contains too much energy to be absorbed, thus continuing its path until it interacts with nuclei 608 releasing a second inelastic gamma 610 and again lowering its energy state again, as seen it decreasing down the y-axis. After the interaction, neutron 602 has kinetic energy close to target energy 612. Herein, target energy 612 may be defined as thermalized neutron state around room temperature. Thus, when neutron 602 has target energy 612 it interacts with nuclei 614. The reaction at nuclei 614 may be captured in an absorption interaction. This interaction results in a rearranged nucleus 616 containing neutron 602 and an emitted capture gamma 618. Sensing these events with PNL tool 102 using first neutron detector 112, second neutron detector 114, and/or gamma ray detector 116 may be defined as PNL measurements. Additionally, PNL measurements may be taken at one or more locations. Neutron source 110 may generate fast neutrons at one or more depths within borehole 104, a response may be recorded by neutron detector 112, second neutron detector 114, and/or gamma ray detector 116 at one or more depths. Neutron detector 112, second neutron detector 114, and/or gamma ray detector 116 may record gamma rays from inelastic and captured gammas within borehole 104 and formation 108 as a scattering rate, via traditional techniques. PNL measurements may allow for the identification of oil, gas, and/or water in borehole 104.

Measurement operations described herein may implement one or more PNL measurements from a first neutron detector 112, second neutron detector 114, and/or gamma ray detector 116. PNL measurement may rely on characteristic nuclear excitation and relaxation process that is induced by high-energy particles, as discussed in FIG. 6. Interaction mechanisms of certain high-energy particles may also present a transient behavior for elemental analysis. Transient behavior of neutron diffusion may be closely related to the neutron capture cross section. Absorption cross section peaks when the neutron is moderated to the thermal energy of 0.025 eV (assuming 50° C. ambient temperature). By measuring the total gamma counts expelled from formation 108, or nuclear excitation (e.g., referring to FIG. 1) as a function of time, a characteristic decay constant of count rate may be found. Decay constants may correlate the PNL measurement to the total capture cross section. Inelastic measurement may be used carbon and oxygen analysis independent of water salinity. Neutron inelastic scatter only occurs when neutron energy is high enough to excite the target nucleus. Thus, during PNL measurement operations fast neutrons may be used. In general, 604, 608, and 616 may trend in heavier to lighter elements.

As discussed above, the excited target nucleus relaxes to its ground state by emitting characteristic gamma radiation, which may be recorded for PNL measurement operations. Phenomenologically, each measurement is unique for a set of petrophysical properties. Petrophysical properties may comprise borehole and casing size, tool position and standoff, borehole fluid content, casing and cement quality, formation lithology, formation porosity, formation oil saturation, holdup, and/or the like. Formation porosity and formation lithology may be utilized to determine fluid saturation. Generally, open hole logs may be available to determine formation porosity and lithology before a borehole 104 (e.g., referring to FIG. 1) is cased. However, when open-hole data is not available, PNL tool 102 may be utilized to obtain PNL measurements in order to determine formation porosity and/or lithology for petrophysical evaluations.

PNL measurements provide several physics modes and transient analysis of fast neutron interactions in borehole and formation medium. Traditionally, the combination of capture and inelastic modes of inelastic and capture gammas is used to calculate formation porosity and/or lithology. Additionally, elemental yields from both inelastic scattering and capture spectrum may be used to build lithology volumetrics. Formation porosity and formation lithology may be determined simultaneously with the application of PNL measurements. A supervised machine learning (ML) model may utilize a neural network to process PNL measurements from a first neutron detector 112, a second neutron detector 114, and a gamma ray detector 116 (e.g., referring to FIG. 1) at one or more depths to determine formation porosity and lithology. In examples, the neural network may be an artificial neural network.

Figure 7:
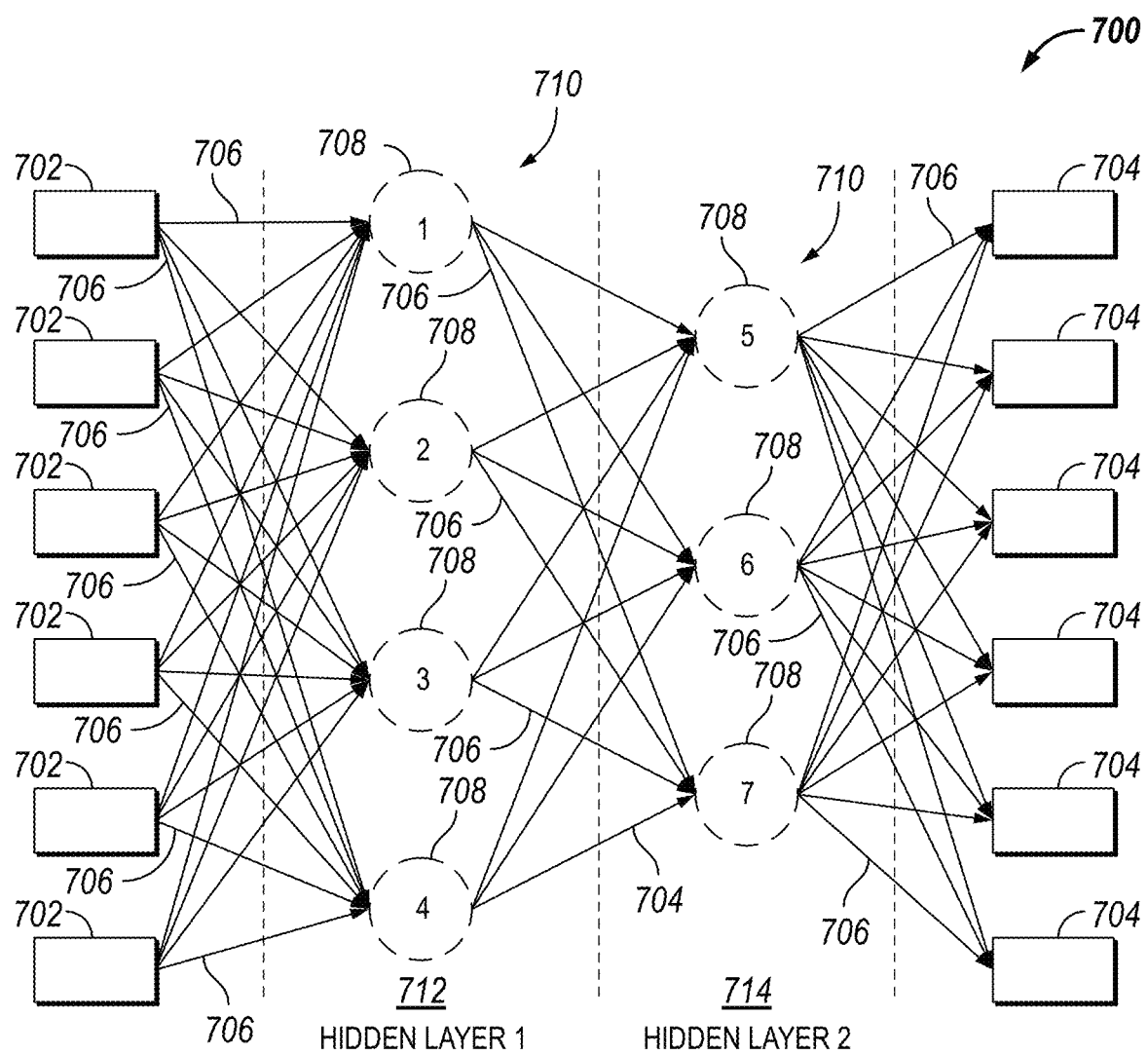
FIG. 7 illustrates an artificial neural network with one or more inputs and one or more outputs.

FIG. 7 illustrates an artificial neural network 700 with one or more inputs 702 and one or more outputs 704. Artificial neural network 700 may be performed on information handling system 122 (e.g., referring to FIG. 1). Herein, one or more inputs 702 may be defined as PNL measurements from a first neutron detector 112, a second neutron detector 114, and a gamma ray detector 116 (e.g., referring to FIG. 1) at one or more depths. Additionally, one or more inputs may comprise multiple ratios of capture and inelastic gammas, time decay constants from borehole and formation, and elemental yields from both inelastic and capture spectrum. One or more outputs 704 may be defined as formation porosity and lithology. In examples, a pre trained artificial neural network may be trained to form artificial neural network 700 with combined PNL measurements and open hole measurements defined as a training inputs. Herein, open hole measurements may be defined as resistivity, acoustic, or any other traditional open hole measuring technique to obtain formation porosity and lithology. In examples, at least some open hole measurements may be populated in a data portfolio. During training, data from the data portfolio may comprise open hole measurements. Data from the data portfolio may be used to calculate formation porosity and lithology via traditional methods. Formation porosity and lithology from the data portfolio may be defined as training outputs for a given formation. Training inputs may be PNL measurements from the same formation. A pre-trained artificial neural network may determine a regression function that provides an optimal relationship between training inputs and training outputs. Training inputs and training outputs may be from any number or wells at any number of depths. Optimization may be based on minimizing a cost function. After training, artificial neural network 700 may be configured to compute one or more outputs 704 from one or more inputs 702. Information may flow between one or more inputs 702 and one or more outputs 704.

During operations, information between one or more inputs 702 to outputs 704 may be passed through one or more pathways 706 (edges) in an artificial neural network. One or more pathways 706 may allow for the flow of data throughout artificial neural network 700. In most neural network solutions, additional internal (hidden) nodes 708 may be introduced to increase the number of connections and improve the accuracy of the solution. These nodes 708 may be interconnected to inputs 702 and outputs 704 as well as each other. A regression function may be determined for each node which provides an optimal relationship between training inputs and training outputs. Determining a regression function for each node may be a trial by error and iterative process where regression function for each node may be updated based on the received input and output every time data flows through. The objective for the regression function for each node may be to compute the output with the received input. The regression function for each node may be different for each node and dependent on the structure of artificial neural network and hyper parameters, to be discussed below. In some systems, there may be multiple layers of hidden nodes 708. In examples, if there are two hidden layers 710, there may be connections between inputs 702 and nodes 708 of a $1^{st}$ hidden layer 712. Nodes 708 in $1^{st}$ hidden layer 712 may be furthermore connected to nodes 708 in a $2^{nd}$ hidden layer 714. The number of nodes 708 and hidden layers (i.e., 712, 714) are called "hyperparameters" of artificial neural network 700. Finally, nodes 708 in $2^{nd}$ hidden layer 714 may be connected to outputs 704. In other words, input 702 and outputs 704 may not be connected directly but through nodes 708 of one or more hidden layers 710.

For artificial neural network 700 there are no set rules for the number of nodes 708 that may be utilized. However, in artificial neural network 700 the number of nodes 708 may generally be chosen based at least in part on the order of the number of inputs 702 multiplied by the number of outputs 704. Similarly, there are no rules for the number of hidden layers (i.e., 712, 714), however, at least one hidden layer may be suitable. It should be noted that the larger an artificial neural network 700 is, the larger computational load and computing time for processing may be. The computational load and computing time may be spread over a network that comprises a plurality of information handling systems 122. Additionally, any of the steps corresponding to artificial neural network 700 may be performed on more than one information handling system 122.

Figure 8:
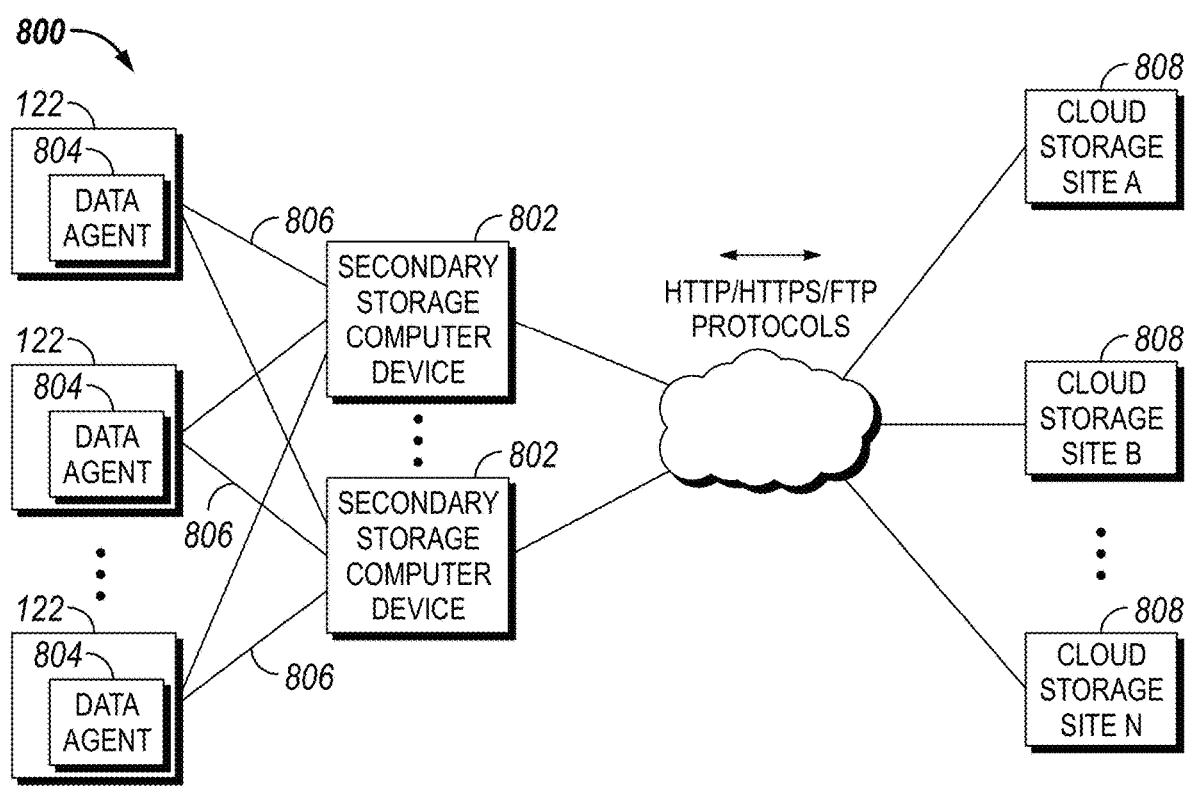
FIG. 8 illustrates an example of one arrangement of resources in a computing network.

FIG. 8 illustrates an example of one arrangement of resources in a computing network 800 that may employ the processes and techniques of implementing more than one information handling system 122, although many others are of course possible. As noted above, an information handling system 122, as part of their function, may utilize data, which comprises files, directories, metadata (e.g., access control list (ACLS) creation/edit dates associated with the data, etc.), and other data objects. The data on the information handling system 122 is typically a primary copy (e.g., a production copy). During a copy, backup, archive or other storage operation, information handling system 122 may send a copy of some data objects (or some components thereof) to a secondary storage computing device 802 by utilizing one or more data agents 804.

A data agent 804 may be a desktop application, website application, or any software-based application that is run on information handling system 122. As illustrated, information handling system 122 may be disposed at any well site (e.g., referring to FIG. 1) or at an offsite location. The data agent may communicate with a secondary storage computing device 802 using communication protocol 806 in a wired or wireless system. Communication protocol 806 may function and operate as an input to a website application. In the website application, field data related to pre- and post-operations, notes, and the like may be uploaded. Additionally, information handling system 122 may utilize communication protocol 806 to access processed measurements, troubleshooting findings, historical run data, and/or the like. This information is accessed from secondary storage computing device 802 by data agent 804, which is loaded on information handling system 122.

Secondary storage computing device 802 may operate and function to create secondary copies of primary data objects (or some components thereof) in various cloud storage sites 808A-N. Additionally, secondary storage computing device 802 may run determinative algorithms on data uploaded from one or more information handling systems 122, discussed further below. Communications between the secondary storage computing devices 802 and cloud storage sites 808 A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 808 A-N, the secondary storage computing device 802 may also perform local content indexing and/or local object-level, sub-object-level or block-level deduplication when performing storage operations involving various cloud storage sites 808 A-N. Cloud storage sites 808 A-N may further record and maintain logs for each downhole operation or run, store repair and maintenance data, store operational data, and/or provide outputs from determinative algorithms that are located in cloud storage sites 808 A-N. In a non-limiting example, this type of network may be utilized as a platform to store, backup, analyze, import, preform extract, transform and load ("ETL") processes, mathematically process, apply machine learning algorithms, and interpret the data acquired by one or more PNL tools 102 (e.g., referring to FIG. 1). PNL measurements acquired by one or more PNL tools 102 may be stored as historical data within cloud storage sites 808 A-N.

Figure 9:
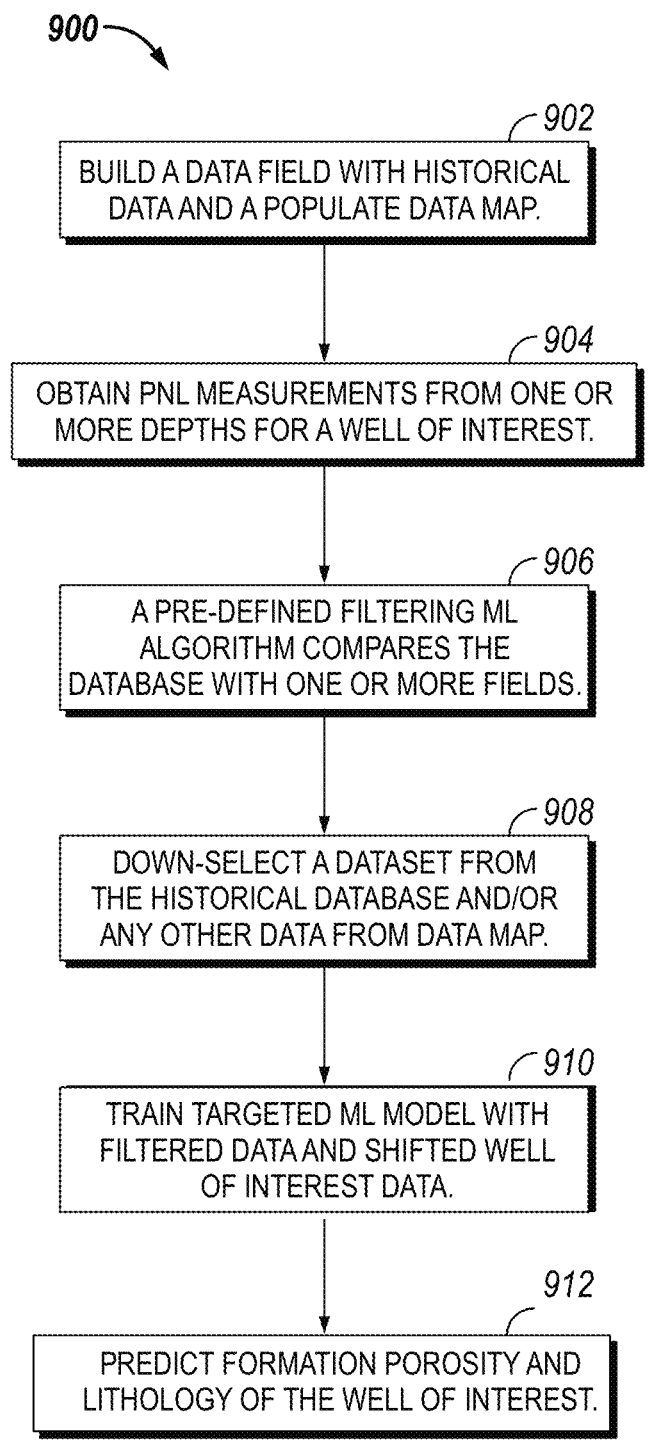
FIG. 9 illustrates a workflow for training a targeted ML model.
Figure 10A:
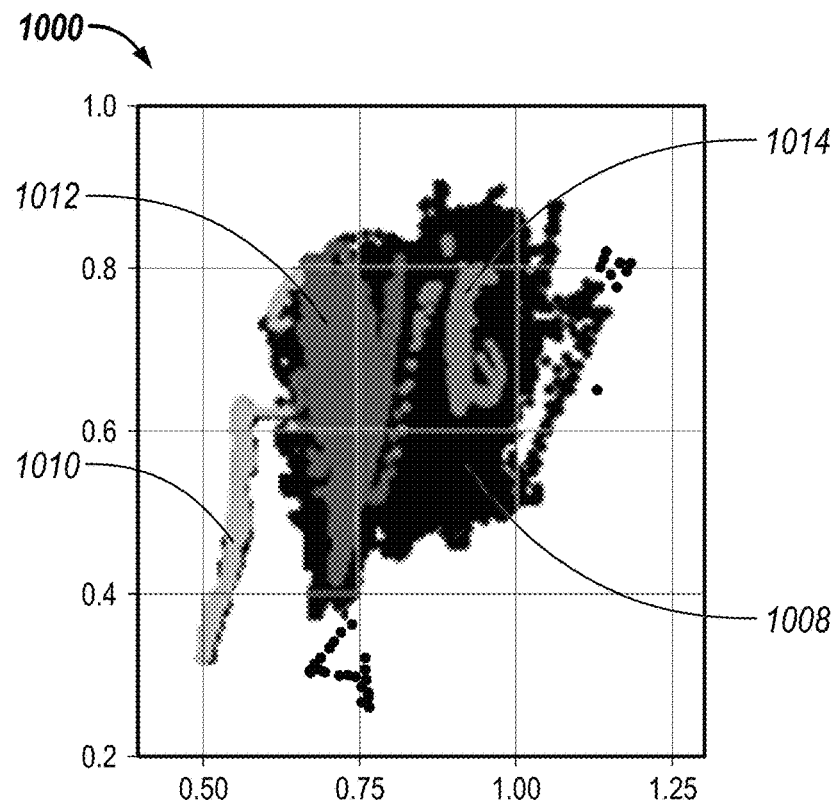
FIG. 10A is a graph that illustrates a theoretical result of data map.

FIG. 9 illustrates a workflow 900 to train a targeted machine learning (ML) model for a well of interest (WOI) (i.e., borehole 104) with historical data. Historical data may be implemented to train and operate a targeted ML model. Once trained, the targeted ML model may determine formation porosity and/or formation lithology with PNL measurement operations. Historical data may comprise PNL measurements from WOI, a different borehole in the same field as the WOI, a different borehole in a different field but the same reservoir as the WOI, or a different borehole in a different reservoir as the WOI. For this disclosure, it should be noted that a reservoir may stack up in the vertical direction. A field may only have one reservoir or multiple reservoirs, targets, or pay zones. Workflow 900 may be performed on one or more information handling system 122 (e.g., referring to FIG. 1). Workflow 900 may begin with block 902 which may build data field 1008, as illustrated in FIG. 10A, with historical data from cloud storage sites 808 A-N (e.g., referring to FIG. 8) and populate data field 1008 onto data map 1000. In block 904, one or more PNL measurements from a measurement operation may be obtained at more than one depth of the WOI, as described above. Additionally, in block 904 data map 1000 may be populated with first field 1010, second field 1012, and third field 1014. In examples, any number of fields may be used in workflow 900. Each field may be defined as a specific region of interest within the WOI, and two adjacent fields may be separated by 10 feet-10,000 feet.

FIG. 10A illustrates a theoretical result of blocks 902 and 904, which may produce a data map 1000 populated with data field 1008, first field 1010, second field 1012, and third field 1014. The axis of FIGS. 10A, 10B, 10C, and 10D may be PNL measurement along the x-axis, and formation porosity along the y-axis. However, in examples the y-axis may be formation lithology, a combination of formation lithology and porosity, or a quantitative characteristic which may correlate to formation porosity and/or lithology.

Figure 10B:
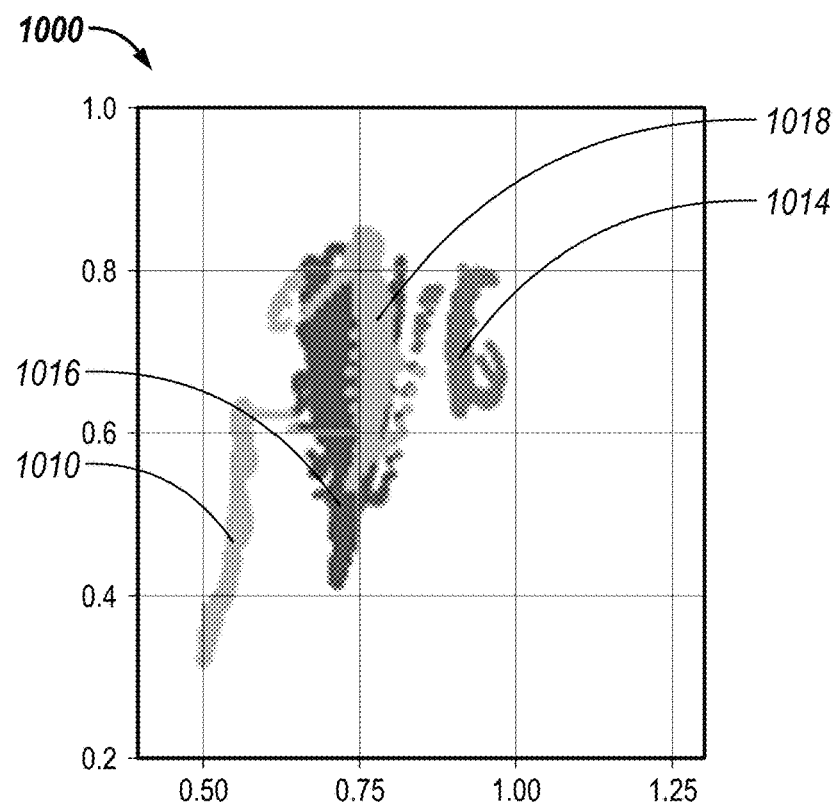
FIG. 10B is a graph that illustrates nearfield and well of interest data.

Referring back to FIG. 9, data field 1008, first field 1010, second field 1012, and third field 1014 may be used in block 906 as an input into a pre-defined filtering machine learning (ML) algorithm. The pre-defined filtering ML algorithm may first establish filters with pre-determined parameters and PNL measurements of the well of interest (WOI) from any number of fields. First field 1010, second field 1012, and third field 1014 are employed in FIG. 10B as an illustrative example. The established filters may then be used to identify nearfield 1016 by removing data from data field 1008 outside of the established filters. Additionally, the pre-defined filtering ML algorithm may filter out any field to form nearfield 1016. Third filed 1014 is used as an example illustrative example in FIG. 10B. In examples, more than one field may be used to form nearfield 1016. A pre-defined filtering ML algorithm may be formed from learning the behavior of the data structure and spread of historic dataset. The pre-defined filtering ML algorithm may train PNL measurements as an input with computed open hole as previously described in FIG. 7. The pre-defined filtering ML algorithm may form at least one adaptive filter, adjustable for receiving PNL measurements from different fields for the WOI. As described above, each filter may be configured to remove at least part of the WOI and remove dissimilar historical data. Additionally, the filters may be configured along both the same x and y axis or along a single x or y axis as FIGS. 10A-10D. An illustrative example for the result of block 906 may yield FIG. 10B. FIG. 10B illustrates nearfield 1016 and WOI data 1018. Additionally, WOI data 1018 may be formed from pre-defined filtering ML algorithm as a selection of data from first field 1010, second field 1012, and third field 1014.

Figure 10C:
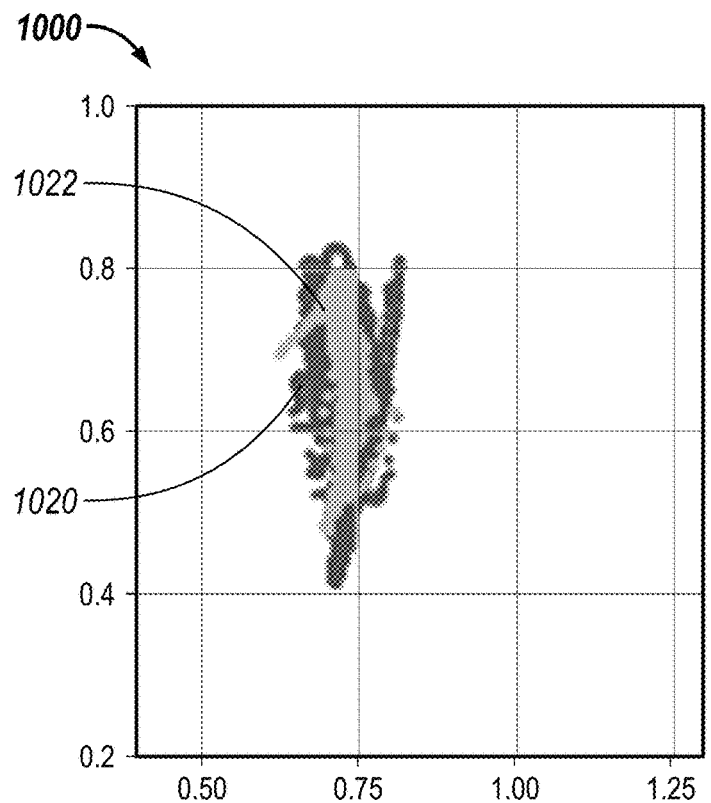
FIG. 10C is a graph that illustrates filtered data formed with a pre-defined filtering ML algorithm.

In Block 908, the pre-defined filtering ML algorithm may comprise classification and regression filter to down-select a dataset from the historical database and/or any other data from data map 1000. In examples, the product of block 908 may form FIG. 10C. As illustrated in FIG. 10C, filtered data 1020 may be formed with the pre-defined filtering ML algorithm. Additionally, the pre-defined filtering ML algorithm may shift WOI data 1018 to form shifted WOI data 1022.

Figure 10D:
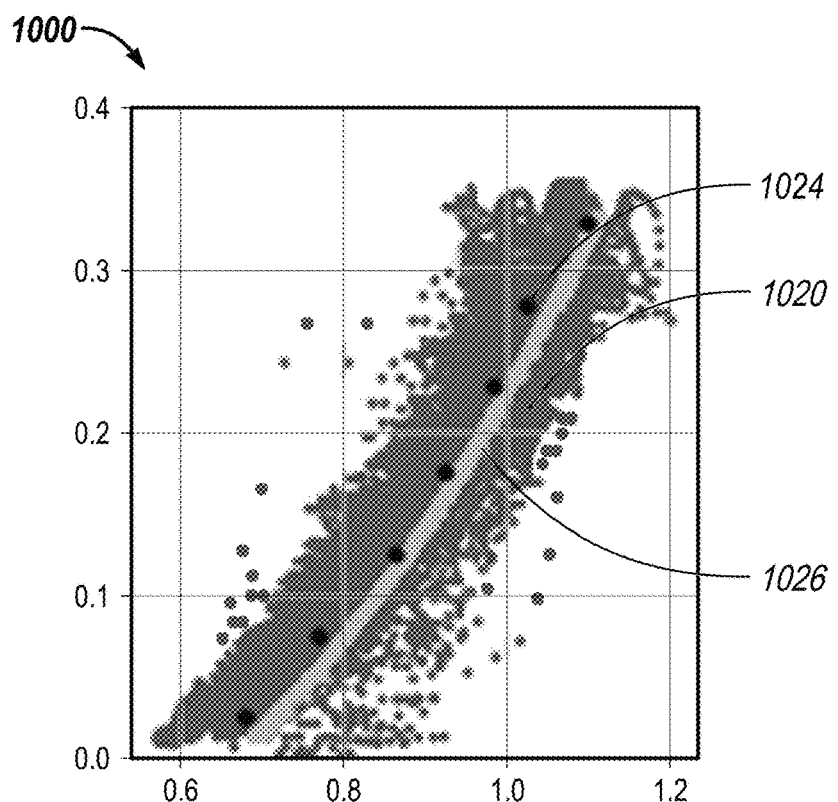
FIG. 10D is a graph that illustrates the result of trained targeted ML model.

Block 910 may train a targeted ML model with shifted WOI data 1022 and filtered data 1020. The targeted ML model may train shifted WOI data 1022 as the training input and filtered data 1020 as the training output, as previously described above. Additionally, block 910 may implement one or more hisfits 1024 to train the targeted ML model. Herein, a hisfit 1024 may be a unique technique that fits the distribution of shifted WOI data 1022 and filtered data 1020 and finds a fitting function between them. Each hisfit 1024 from the one or more hisfits 1024 may be separated by different regions of interest within shifted WOI data 1022. FIG. 10D illustrates the curve of trained targeted ML model 1026. Block 914 may predict formation porosity and lithology of the WOI by inputting PNL measurements into target ML model 940. Target ML model may comprise a similar structure to artificial neural network 700.

Currently technology is not able to simultaneously determine formation porosity and formation lithology with PNL measurements for cased wells. Systems and methods herein relate to implementing machine learning (ML) techniques in a novel application to determine formation properties by combining open hole and PNL measurement operations. Additionally, improvements over current technology are at least partially found in applying historical data from a variety of locations to train a single targeted ML model for a well of interest (WOI).

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

The systems and methods may include any of the various features disclosed herein, including one or more of the following statements.

Statement 1: A method may comprise disposing a pulsed neutron logging (PNL) tool into a borehole that is disposed in a formation, emitting at least one neutron from a neutron source on the PNL tool into the formation, capturing one or more gamma rays with a gamma ray detector expelled from formation in response to the at least one neutron from the neutron source to form a plurality of PNL measurements in a log, and identifying at least one formation property with the plurality of PNL measurements and a Neural Network (NN).

Statement 2: The method of statement 1, further comprising obtaining a data portfolio, wherein the data portfolio comprises at least one formation property.

Statement 3: The method of statement 2, further comprising performing open hole measurements to obtain the data portfolio, wherein the open hole measurements are resistive or acoustic measurements.

Statement 4: The method of statements 1, 2, or 3, wherein the NN is an artificial neural network.

Statement 5: The method of statements 1-3 wherein the NN comprises one or more hidden layers.

Statement 6: The method of statement 5 further comprising training the NN with at least the plurality of PNL measurements and the data portfolio.

Statement 7: The method of statement 6, wherein the one or more training inputs and the one or more training outputs are separated by at least one node within at least one hidden layer.

Statement 8: The method of statement 7, wherein the one or more training inputs and the one or more training outputs are separated by at least one node within the at least one hidden layer.

Statement 9: The method of statement 8, wherein the one or more training inputs are connected to the one or more nodes and the one or more nodes are connected to the one or more training outputs via one or more pathways.

Statement 10: The method of statement 9, further comprising determining a regression function for each of the one or more nodes.

Statement 11: A system may comprise a pulsed neutron logging (PNL) tool comprising neutron source configured to emit at least one neutron into a formation, and a gamma ray detector configured to measure one or more gamma rays from an inelastic gamma or a captured gamma from the formation, and an information handling system configured to form a plurality of PNL measurements in a log from the one or more gamma rays, identify at least one formation property with the plurality of PNL measurements a Neural Network (NN), and create a data portfolio from the at least one formation property.

Statement 12: The system of statement 11, wherein the NN comprises at least one hidden layer.

Statement 13: The system of statement 12, wherein the information handling system further trains the NN with at least the plurality of PNL measurements and the data portfolio.

Statement 14: The system of statement 13, wherein the plurality of PNL measurements are one or more training inputs and the data portfolio comprises one or more training outputs for the NN.

Statement 15: The system of statement 14, wherein the one or more training inputs and the one or more training outputs are separated by at least one node within the at least one hidden layer, wherein the one or more training inputs are connected to the one or more nodes and the one or more nodes are connected to the one or more training outputs via one or more pathways.

Statement 16: The system of statement 15, wherein the information handling system further determines a regression function for each of the one or more nodes.

Statement 17: A non-transitory storage computer-readable medium storing one or more instructions that, when executed by a processor may cause the processor to build a filtering machine learning (ML) algorithm from at least historical data and a plurality of pulsed neutron logging (PNL) measurements from one or more depths from a well of interest (WOI).

Statement 18: The non-transitory storage computer-readable medium of statement 17, wherein the historical data from the same borehole as the WOI, a different borehole in the same field as the WOI, a different borehole in a different field but the same reservoir as the WOI, or a different borehole in a different reservoir as the WOI.

Statement 19: The non-transitory storage computer-readable medium of statement 18 wherein the filtering ML algorithm establishes filters with pre-determined parameters and the PNL measurements from one or more depths for a WOI.

Statement 20: The non-transitory storage computer-readable medium of statement 19, wherein the one or more instructions, that when executed by the processor, further cause the processor to identify a nearfield with at least the historical data and the PNL measurements from one or more depths for a WOI.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   disposing a pulsed neutron logging (PNL) tool into a borehole that is disposed in a formation;
   emitting at least one neutron from a neutron source on the PNL tool into the formation;
   capturing one or more gamma rays with a gamma ray detector expelled from formation in response to the at least one neutron from the neutron source to form a plurality of PNL measurements in a log;
   acquiring a plurality of historical PNL measurements;
   reducing the number of plurality of historical PNL measurements to form a reduced set of PNL measurements;
   training a targeted machine learning (ML) model based on the reduced set of PNL measurements and plurality of PNL measurements; and
   identifying at least one formation property with the targeted ML model.

2. The method of claim 1, further comprising obtaining a data portfolio, wherein the data portfolio comprises at least one formation property.

3. The method of claim 2, further comprising performing open hole measurements to obtain the data portfolio, wherein the open hole measurements are resistive or acoustic measurements.

4. The method of claim 1, wherein the NN is an artificial neural network.

5. The method of claim 1, wherein the NN comprises at least one hidden layer.

6. The method of claim 5, further comprising training the NN with at least the plurality of PNL measurements and the data portfolio.

7. The method of claim 6, wherein the plurality of PNL measurements are one or more training inputs and the data portfolio comprises one or more training outputs for the NN.

8. The method of claim 7, wherein the one or more training inputs and the one or more training outputs are separated by at least one node within the at least one hidden layer.

9. The method of claim 8, wherein the one or more training inputs are connected to the one or more nodes and the one or more nodes are connected to the one or more training outputs via one or more pathways.

10. The method of claim 9, further comprising determining a regression function for each of the one or more nodes.

11. A system comprising:
    a pulsed neutron logging (PNL) tool comprising:
    a neutron source configured to emit at least one neutron into a formation; and
    a gamma ray detector configured to measure one or more gamma rays from an inelastic gamma or a captured gamma from the formation; and
       an information handling system configured to:
          form a plurality of PNL measurements in a log from the one or more gamma rays;
          acquire a plurality of historical PNL measurements;
          reduce the number of plurality of historical PNL measurements to form a reduced set of PNL measurements;
          train targeted machine learning (ML) model based on the reduced set of PNL measurements and the plurality of PNL measurements;
          identify at least one formation property with the targeted ML model; and
          create a data portfolio from the at least one formation property.

12. The system of claim 11, wherein the NN comprises at least one hidden layer.

13. The system of claim 12, wherein the information handling system further trains the NN with at least the plurality of PNL measurements and the data portfolio.

14. The system of claim 13, wherein the plurality of PNL measurements are one or more training inputs and the data portfolio comprises one or more training outputs for the NN.

15. The system of claim 14, wherein the one or more training inputs and the one or more training outputs are separated by at least one node within the at least one hidden layer, wherein the one or more training inputs are connected to the one or more nodes and the one or more nodes are connected to the one or more training outputs via one or more pathways.

16. The system of claim 15, wherein the information handling system further determines a regression function for each of the one or more nodes.

17. A non-transitory storage computer-readable medium storing one or more instructions that, when executed by a processor, cause the processor to:

form a plurality of PNL measurements in a log from one or more gamma rays;
acquire a plurality of historical PNL measurements;
reduce the number of plurality of historical PNL measurements to form a reduced set of PNL measurements;
train a targeted machine learning (ML) model based on the reduced set of PNL measurements and the plurality of PNL measurements; and
identify at least one formation property with the targeted ML model.

18. The non-transitory storage computer-readable medium of claim 17, wherein the historical data from the same borehole as the WOI, a different borehole in the same field as the WOI, a different borehole in a different field but the same reservoir as the WOI, or a different borehole in a different reservoir as the WOI.

19. The non-transitory storage computer-readable medium of claim 18, wherein the filtering ML algorithm establishes filters with pre-determined parameters and the PNL measurements from one or more depths for a WOI.

20. The non-transitory storage computer-readable medium of claim 19, wherein the one or more instructions, that when executed by the processor, further cause the processor to identify a nearfield with at least the historical data and the PNL measurements from one or more depths for a WOI.

* * * * *